(12) United States Patent
Weiner (10) Patent No.: US 9,417,988 B2
(45) Date of Patent: Aug. 16, 2016

(54) TRACKING SUBCLASSES OF AND OPERATIONS PERFORMED BY GENERIC OBJECTS IN A COMPUTER SYSTEM

(71) Applicant: Red Hat, Inc., Raleigh, NC (US)

(72) Inventor: Johannes Weiner, Princeton, NJ (US)

(73) Assignee: Red Hat, Inc., Raleigh, NC (US)

( * ) Notice: Subject to any disclaimer, the term of this patent is extended or adjusted under 35 U.S.C. 154(b) by 327 days.

(21) Appl. No.: 13/777,342

(22) Filed: Feb. 26, 2013

(65) Prior Publication Data

US 2014/0245065 A1 Aug. 28, 2014

(51) Int. Cl.
*G06F 11/00* (2006.01)
*G06F 11/36* (2006.01)

(52) U.S. Cl.
CPC .................................. *G06F 11/3636* (2013.01)

(58) Field of Classification Search
CPC ............. G06F 9/3869; G06F 11/3632; G06F 11/3636; G06F 11/362; G06F 11/3664
USPC ........... 717/128, 129, 130; 714/30, 34, 38.11, 714/38.13
See application file for complete search history.

(56) References Cited

U.S. PATENT DOCUMENTS

| | | | | |
|---|---|---|---|---|
| 5,970,241 A * | 10/1999 | Deao et al. | | 712/227 |
| 6,065,106 A * | 5/2000 | Deao et al. | | 712/24 |
| 6,083,281 A * | 7/2000 | Diec et al. | | 717/128 |
| 6,139,198 A * | 10/2000 | Danforth et al. | | 717/128 |
| 6,798,713 B1 * | 9/2004 | Yearsley et al. | | 365/238.5 |
| 7,131,114 B2 * | 10/2006 | Nguyen et al. | | 717/129 |
| 7,313,661 B1 * | 12/2007 | Dmitriev | | 711/159 |
| 7,502,972 B1 * | 3/2009 | Chilukuri | G06F 11/3688 | 714/38.12 |
| 7,739,374 B1 * | 6/2010 | Frey et al. | | 709/224 |
| 8,719,788 B2 * | 5/2014 | Merry | | 717/124 |
| 8,762,951 B1 * | 6/2014 | Kosche | G06F 11/3476 | 717/127 |
| 8,863,088 B2 * | 10/2014 | Kratochvil | | 717/125 |
| 9,026,861 B2 * | 5/2015 | Peck | | 714/45 |
| 9,047,399 B2 * | 6/2015 | Grunberg et al. | | |
| 2002/0120918 A1 * | 8/2002 | Aizenbud-Reshef et al. | | 717/127 |
| 2003/0014736 A1 * | 1/2003 | Nguyen et al. | | 717/129 |
| 2003/0061550 A1 * | 3/2003 | Ng et al. | | 714/45 |
| 2003/0088854 A1 * | 5/2003 | Wygodny et al. | | 717/130 |
| 2004/0177100 A1 * | 9/2004 | Bjorner et al. | | 707/206 |
| 2005/0091644 A1 * | 4/2005 | Chilimbi | | 717/128 |
| 2006/0085684 A1 * | 4/2006 | Drori et al. | | 714/34 |
| 2006/0242627 A1 * | 10/2006 | Wygodny et al. | | 717/128 |
| 2006/0253837 A1 * | 11/2006 | Hudson | G06F 11/366 | 717/124 |
| 2008/0109796 A1 * | 5/2008 | Kosche | G06F 11/3612 | 717/158 |
| 2008/0127149 A1 * | 5/2008 | Kosche | G06F 8/443 | 717/158 |
| 2009/0089764 A1 * | 4/2009 | Lai et al. | | 717/143 |
| 2010/0218002 A1 * | 8/2010 | Graziani | G06F 21/64 | 713/194 |
| 2013/0054942 A1 * | 2/2013 | Serrano | G06F 11/3612 | 712/234 |

* cited by examiner

*Primary Examiner* — Bryce Bonzo
*Assistant Examiner* — Jeison C Arcos
(74) *Attorney, Agent, or Firm* — Lowenstein Sandler LLP (57) ABSTRACT

A mechanism for tracking subclasses of and operations performed by generic objects in a computer system is disclosed. A method of the disclosure includes receiving, by a debugging tool executed from a processing device, an invocation from a code annotation in a function executed by the processing device, the invocation to initialize an object subclass tracking module of the debugging tool, requesting a stack trace of a call stack of the function, generating an identification (ID) using the requested stack trace, and storing the generated ID and the stack trace in a new entry in an object tracking table.

20 Claims, 7 Drawing Sheets

TRACKING SUBCLASSES OF AND OPERATIONS PERFORMED BY GENERIC OBJECTS IN A COMPUTER SYSTEM

TECHNICAL FIELD

The embodiments of the disclosure relate generally to operating systems and, more specifically, relate to tracking subclasses of and operations performed by generic objects in a computer system.

BACKGROUND

In a complex software environment implemented by a computer system, there are generic objects that may have many operations defined for them. However, not all operations are performed on all subclasses of these objects. The complexity of the software environment generally makes it difficult or inefficient to determine the subset of operations that are actually performed on a specific subclass of an object through merely examining the code.

In the software environment of an operating system (OS), one particular area of complexity is management of pages. An OS has many different types of pages and uses a variety of data structures to manage these pages. A page is a fixed-length contiguous block of virtual memory used by the OS for memory allocation for a program running on the OS, or for transfer between main memory and any other auxiliary store, such as a hard disk drive.

For example, in a Linux™ operating system (OS), a single class/type of object known as 'struct page' exists that represents a physical page frame of memory. However, there are many non-explicit subclasses of such a 'struct page' object. One such non-explicit subclass may hold the file data of one file system, while another non-explicit subclass may hold the metadata of a different file system, and yet another non-explicit subclass may be a buffer page used by hardware. Similarly, many functions operate on the 'struct page' object. It is often difficult and impractical to determine the subset of functions that are invoked on a certain subclass of 'struct page' under a certain workload by going through function graphs in the code.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide for tracking subclasses of and operations performed by generic objects in a computer system. In one embodiment, an object subclass tracking module of a debugging tool uniquely identifies a subclass of an object and the operations performed by the object subclass. Furthermore, for each subclass, the object subclass tracking module may also identify and track a list of operations performed on the subclass. The results of the identifying and the tracking of subclasses and operations on the subclasses are stored in one or more object tracking tables. The object tracking tables may be accessed at a later time to reproduce stack traces of the subclass creation and operations for debugging purposes. In one embodiment, the object subclass tracking module tracks subclasses of page objects in a kernel of an operating system (OS).

In one embodiment, the object tracking table includes one entry per identified subclass, and one entry in the table per subclass identifier (ID). For example, a million pages that contain data of the same file system produce the same call stack during initialization. Thus, the subclass IDs of each of these page objects are all the same, and a single entry in the object tracking table would identify the subclasses of these page objects associated with the initialization process.

A method of one embodiment of the disclosure includes receiving, by a debugging tool executed from a processing device, an invocation from a code annotation in a function executed by the processing device. The invocation initializes an object subclass tracking module of the debugging tool. The method also includes requesting a stack trace of a call stack of the function and generating an identification (ID) using the requested stack trace. The method further includes storing the generated ID and the stack trace in a new entry in an object tracking table.

A disadvantage of current solutions for code tracking and debugging is that the complexity of the software environment generally makes it difficult or inefficient to determine the subset of operations that are actually performed on a specific subclass of an object through merely examining the code. Embodiments of the invention overcome this disadvantage by identifying subclasses of an object and the operations performed by the object subclass. Then, for each subclass, a list of operations performed on the subclass is also tracked. The results of the identifying and the tracking of subclasses and operations on the subclasses are stored and can be accessed at a later time to reproduce stack traces of the subclass creation and operations for debugging purposes. This storage and tracking utilizes table structures and a minimal space within the object itself to implement the tracking of embodiments of the disclosure. As such, embodiments of the disclosure provide for analysis and debugging of kernel objects in a time and resource efficient manner.

Figure 1:
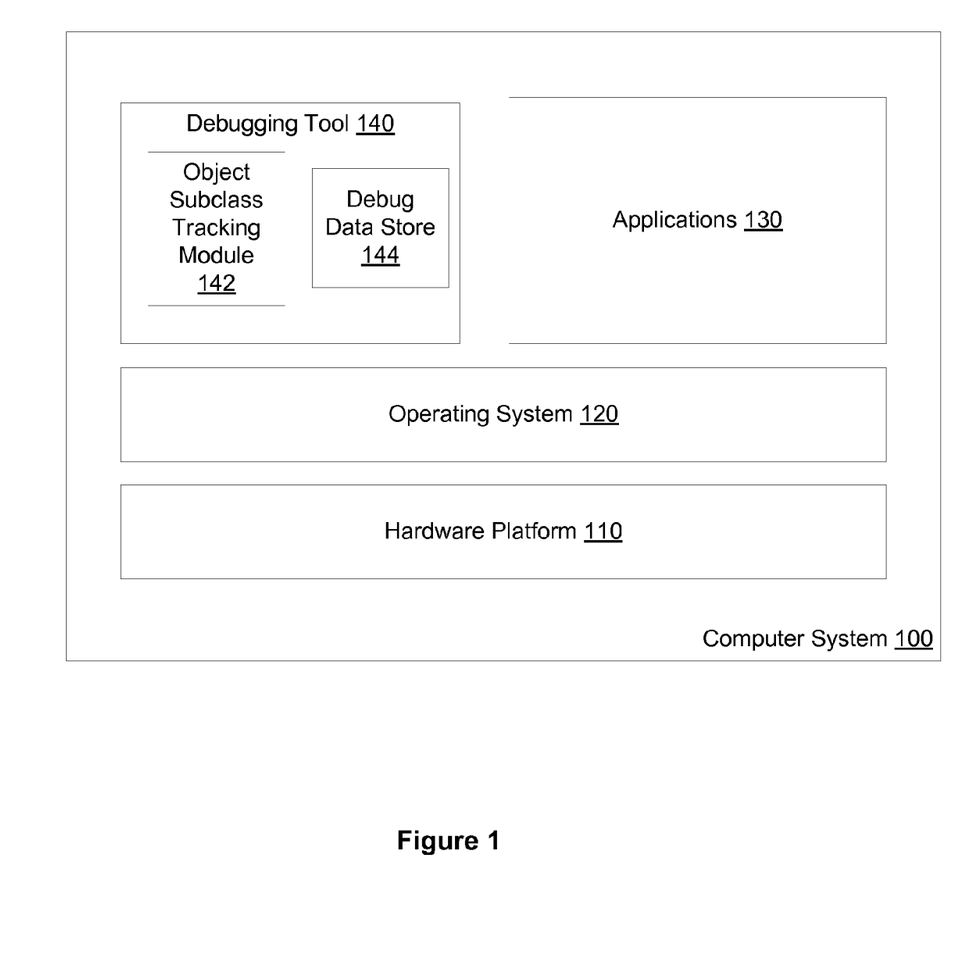
FIG. 1 illustrates a block diagram of an example computing system, in which embodiments of the disclosure may operate.

FIG. 1 illustrates a block diagram of an example computing system 100, in which embodiments of the disclosure may operate. The computing system 100 may be a desktop computer, laptop computer, server (e.g., web server), personal digital assistant, a (PDA), a tablet computer, a mobile device, etc. The computing system 100 may be an individual computing device or a cluster of multiple computing devices.

The computing system 100 includes a hardware platform 110. The hardware platform 110 may include one or more processing devices (central processing units (CPUs)), one or more disk storage devices, a bus, input/output (I/O) devices, and so on. An OS 120 may also execute on the computing system 100 using components of hardware platform 110. In one embodiment, one or more applications 130 may execute on top of OS 120. The applications 130 may be any type of application or program, such as a game, word processor, spreadsheet, server application, browser, operating system, virtual machine, and so on. The applications 130 may be stand alone applications, or may be components of other applications. For example, the applications 130 may be portions of a larger application that handle particular functionality for that larger application.

Computer system 100 also includes a debugging tool 140, which is a computer program that is used to test and debug other programs (the "target" program), such as applications 130. In some embodiments, debugging tool 140 may be a kernel debugger, which is a debugging program present in the kernel of the OS 120 to ease debugging and kernel development by developers of the kernel. In some embodiments, debugging tool 140 may be implemented remotely, so that low-level operations of the debugger are performed at the computer system 100, while a full-scale debugging program 140 is running on another machine (not shown) sending comments to the low-level portion of the debugging tool 140 over a network connection (not shown). An example of a debugging tool 140 is the GNU Debugger (GDB) for the GNU OS. In other embodiments, the debugging tool 140 is an arbitrary construct to represents embedded operations of the OS 120. For example, the kernel of the OS 120 may implement operations of the object subclass tracking tracking module 142 and export the results of the operations of the object subclass tracking module 142 to an end user of the computer system 100 via a virtual file.

In one embodiment, debugging tool 140 includes an object subclass tracking module 142 and a debug data store 144. Object subclass tracking module 142 may identify a subclass of an object and the operations performed on the identified subclass, track these subclasses and associated operations in the debug data store 144, and present a list of the subclasses and a list of operations performed on each subclass using the object tracking data stored in debug data store 144. Debug data store 144 may be implemented on a main memory (not shown) or on another data storage device (not shown). Some embodiments of the debugging tool 140 are discussed in greater detail with reference to FIG. 2.

Figure 2:
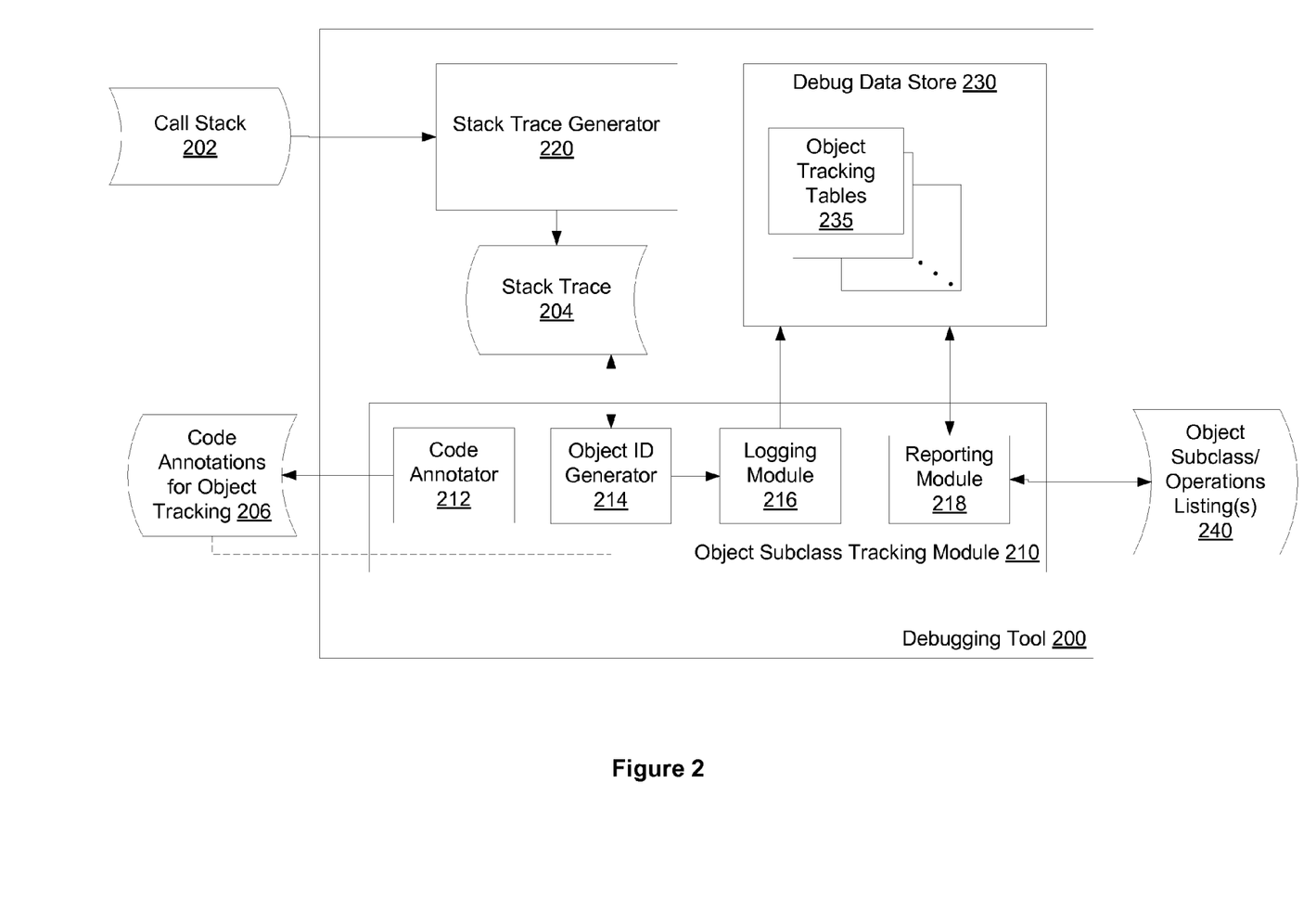
FIG. 2 is a block diagram of a debugging tool for tracking subclasses of and operations performed by generic objects in a computer system according to an embodiment of the disclosure.

FIG. 2 is a block diagram of a debugging tool 200 for tracking subclasses of and operations performed by generic objects in a computer system according to an embodiment of the disclosure. In one embodiment, debugging tool 200 is the same as debugging tool 140 of FIG. 1. Debugging tool 200 includes an object subclass tracking module 210, a stack trace generator 220, and a debug data store 230.

In one embodiment, object subclass tracking module 210 is the same as object subclass tracking module 142 of FIG. 1. Object subclass tracking module 210 identifies subclasses of objects in a low-level language environment, such as a language environment with no native hierarchical class system, for example. In object-oriented programming, an object is a data structure combined with associated processing routines for the data structure. For instance, a file is an object: a collection of data and the associated read and write routines.

In one embodiment, a code annotator 212 of object subclass tracking module 210 annotates various portions of code of a computer program with invocation code. In one embodiment, the code annotator 212 is controlled by a user of the computer system (e.g., a developer) that provides the code annotation representations to insert into the code of the computer program. For example, the user may identify optimal initializer operations where all objects of interest are initialized in order to insert the code annotations.

The computer program may include an application executed by the computer system or low-level code executed by the OS kernel of the computer system. The invocation code calls to the object subclass tracking module 210 to start tracking subclasses and operations of an object associated with the code of the computer program. For example, an object may call a generic initializer function to set default values for attributes that are not specific to any subclass of the object. Code annotator 212 may place a code annotation 206 in this generic initializer function to invoke the object subclass tracking module 201 to identify and track subclasses of the object.

In some embodiments, code annotator 212 also places code annotations 206 in other functions that perform operations of interest (in terms of tracking for debug purposes) on the objects of the tracked subclass. For example, such functions may include operations against the object after it has been initialized. These operations may include, but are not limited to, locking the page, scheduling the page to have its data written to disk, reclaiming the page in order to reuse it for other purposes, and so on.

When a function of a computer program instantiates or initializes an object, the object, regardless of its particular subclass, should call the generic initializer function for the object. In turn, the code annotation 206 causes an object identification (ID) generator 214 of the object subclass tracking module 210 to identify and track a subclass of the object, as well as operations associated with the subclass. The object ID generator 214 identifies the subclass by calling a stack trace generator 220 of the debugging tool 220 to generate a stack trace 204 of the call stack 202 associated with the function initializing the object.

In one embodiment, the call stack 202 is a data structure that stores information about the active subroutines of a computer program. An active subroutine is one that has been called but is yet to complete execution, after which control should be handed back to a point of call. The stack trace generator 220 is a tool that monitors the call stack 202 and creates a report, known as the stack trace 204, of the active stack frames at a certain point in time during execution of the program associated with the call stack 202. The subclass of the object can be identified via the stack trace 204 of the function initializing the object because the stack trace 204 typically contains subclass-specific functions.

The advantage of using the stack trace 204 for subclass identification and tracking is that while object creation happens in subclass-specific functions, the object usually calls a generic initializer function to set default values for attributes not specific to the subclass. The object subclass tracking module 210, which creates and stores the unique ID for the subclass (or subclass operations) of the object, can be invoked from this generic initialization code. As a result, the code annotator 212 modifies a small amount of code base (e.g., the generic initializer functions for one or more objects) with a result of being able to track multiple subclasses of the objects.

Once the stack trace 204 of the object initializing function is obtained, the object ID generator 214 may then generate a unique ID for the identified subclass from the stack trace 204 data. In one embodiment, the object ID generator 214 may use a hash function to generate the unique ID. For example, the object ID generator 214 may sequentially walk through the stack trace 204 and use addresses of each function in the stack trace 204 to calculate a hash. This hash value may then be used as the unique ID for the subclass. This subclass ID may then be reported to the logging module 216 of the object subclass tracking module 210.

Similarly, every function that performs an operation of interest on a tracked object subclass may be separately identified and tracked. As mentioned previously, these operations are modified with code annotations 206 to invoke the object ID generator 214 to identify and track the subclass operation. The object ID generator 214 uses the stack trace 204 of the call stack 202 of the operating function to uniquely identify it. This operation ID, in combination with the subclass ID stored in the object operated on, is now reported to the logging module 216. In one embodiment, a minimal space in the object structure is reserved for the subclass ID. The size of this space may depend on the hash size, but a one machine word may be enough (e.g., 8 bytes on a 64-bit CPU). When the object's subclass is first identified during generic initialization, the ID of that subclass is stored in the object itself.

In one embodiment, the logging module 216 maintains object tracking tables 235 in the debug data store 230 of debugging tool 200. In one embodiment, the object tracking tables 235 include a first tracking table that is indexed by the subclass ID. Each subclass entry of the first tracking table is a structure that includes the subclass ID, the stack trace 204 from which the associated subclass ID was generated, and nested hash tables for each of the operation IDs associated with the subclass. The nested hash tables are indexed by the generated operation ID discussed above, and also contain stack traces 204 of the subclass operating function.

In one embodiment, if the logging module 216 determines that a provided subclass ID or operation ID is already stored in the object tracking tables 235, then an iteration count associated with the particular ID may be increased. This helps control the size of the object tracking tables 235 in terms of number of entries in the tables 235.

After runtime of the objects and operations has completed, a user may query the debugging tool for debug information related to the tracked subclasses and operations of an object. The reporting module 218 of the object tracking tool 210 is responsible for providing listings 240 of object tracking results. The reporting module 218 may access the object tracking tables 235 of debug data store 230 in order to generate results (e.g., listings 240) for a query. For example, the reporting module 218 may provide a listing 240, in response to a user request, for an object tracking result that may appear as follows:

```
<stack trace of subclass A creator>
<stack trace of operation X>
<stack trace of operation Y>
<stack trace of subclass B creator>
<stack trace of operation X>
<stack trace of operation Z>
```

In embodiments of the disclosure, the depth of tracking within a subclass is controlled by placement of the annotations 206 within the code base of a program. Anywhere a code annotation is placed causes the object subclass tracking module 210 to obtain and analyze the stack trace 204 of the call stack 202 at that particular point in code execution. As a result, multiple levels of granularity may be achieved in terms of analyzing subclasses of an object and operations performed on each subclass.

Figure 3:
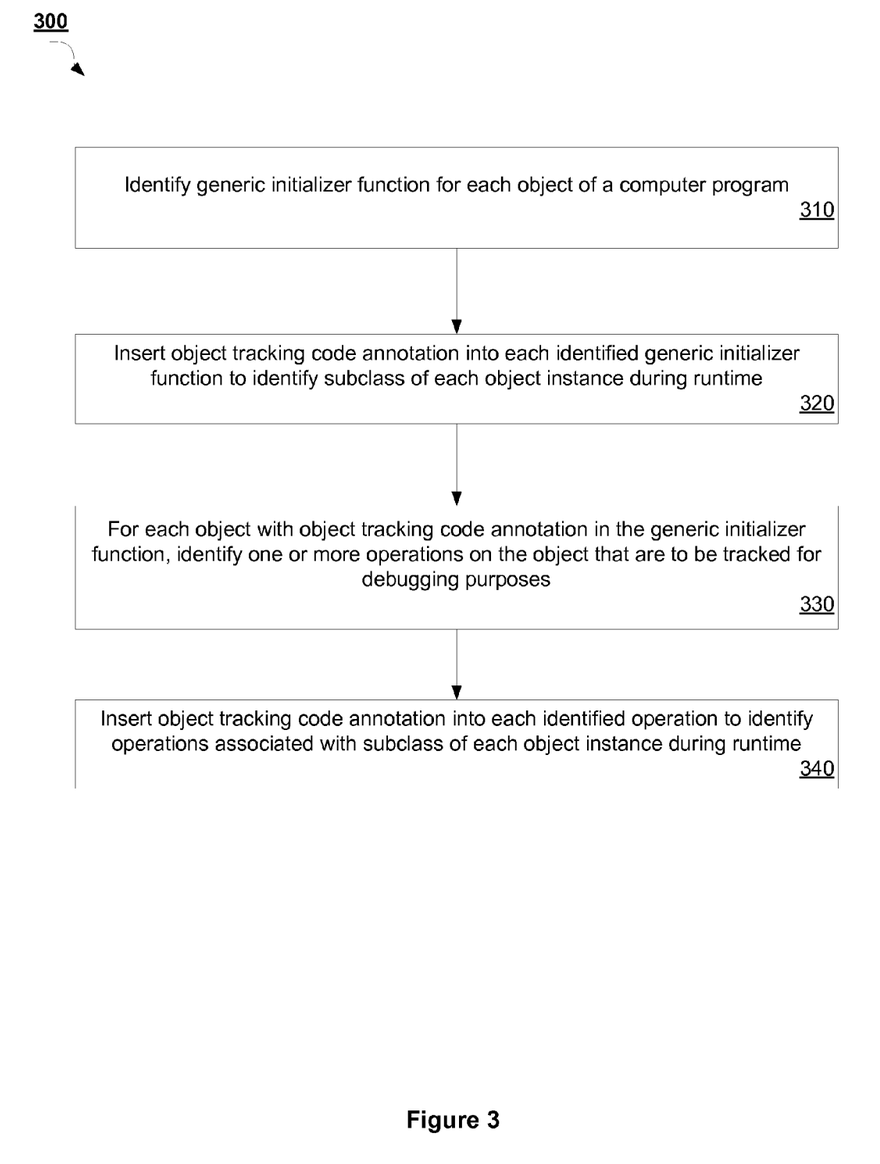
FIG. 3 is a flow diagram illustrating a method for code annotations to support tracking subclasses of and operations performed by generic objects in a computer system according to an embodiment of the disclosure.

FIG. 3 is a flow diagram illustrating a method 300 for providing code annotations to support tracking subclasses of and operations performed by generic objects in a computer system according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by object subclass tracking module 210, and mores specifically code annotator 212, of FIG. 2.

Method 300 begins at block 310 where a generic initializer function for each object of a computer program is identified. In one embodiment, an end user, such as a developer, manually identifies this generic initializer function and indicates a code annotation should be added to the identified functions. In other embodiments, an automated process may identify these functions based on known markers/identifiers that exist within the functions. Then, at block 320, an object tracking code annotation is inserted into each identified generic initializer function for purposes of identifying subclass (e.g., a NTFS file system page) of a specific invoked instance of the object during runtime. In one embodiment, the object tracking code annotation invokes an object subclass tracking module of a debug tool of the computer system executing the function. The object subclass tracking module identifies and tracks a subclass of the object initialized by the generic initializer function.

At block 330, for each object having an object tracking code annotation in the generic initializer function, one or more operations (e.g., write page to disk) of the function that are to be tracked for debugging purposes are identified. In one embodiment, a system administrator may identify these operations using an administrator interface of the debugging tool.

Subsequently, at block 340, object tracking code annotation is inserted into each identified operation for purposes of associating a list of operations against specific subclasses during runtime of an instance of the object. Similar to the description above, the object tracking code annotation invokes an object subclass tracking module of a debug tool of the computer system executing the operation. Using these inserted object tracking code annotations, the object subclass tracking module may identify and track the operations of the subclass of the object that is operated on.

Figure 4A:
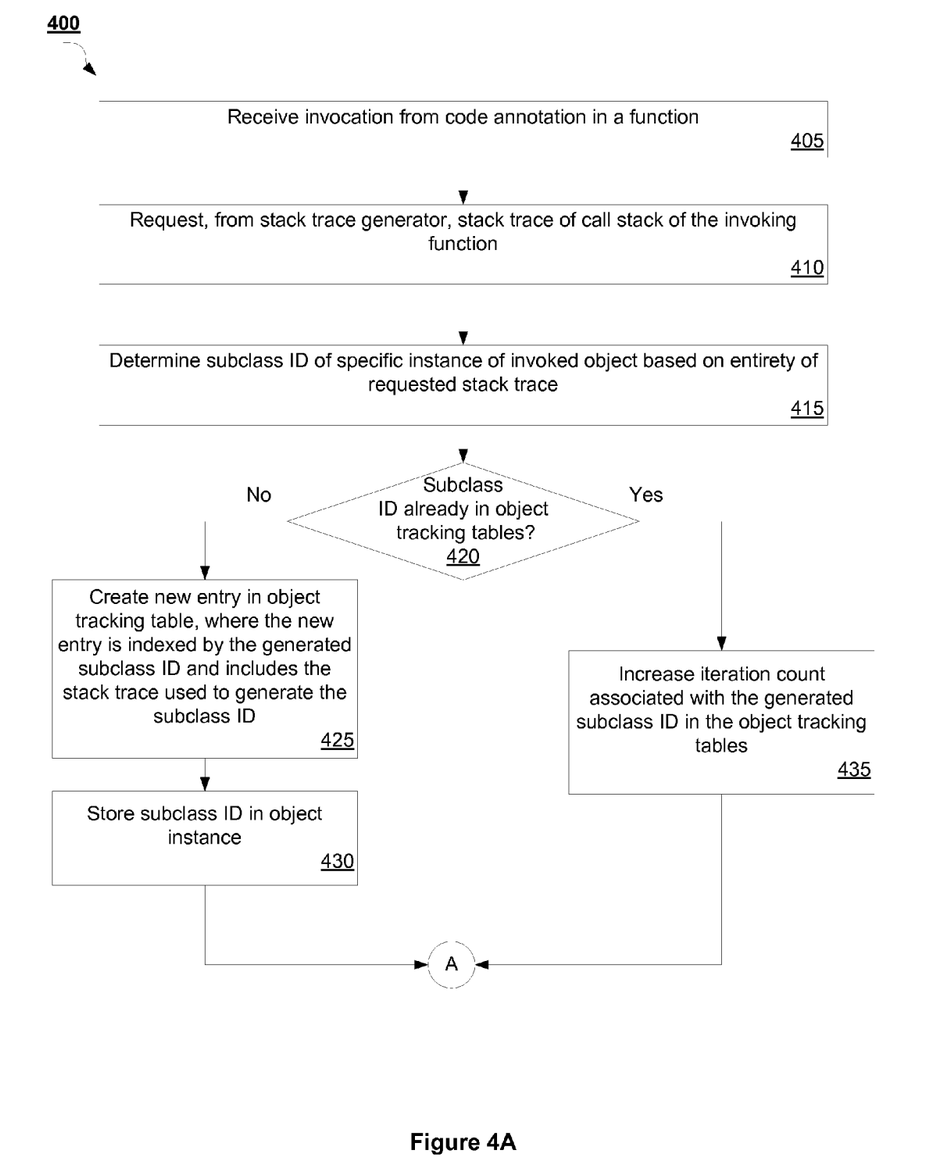
FIGS. 4A and 4B are flow diagrams illustrating a method for tracking subclasses of and operations performed by generic objects in a computer system according to an embodiment of the disclosure.
Figure 4B:
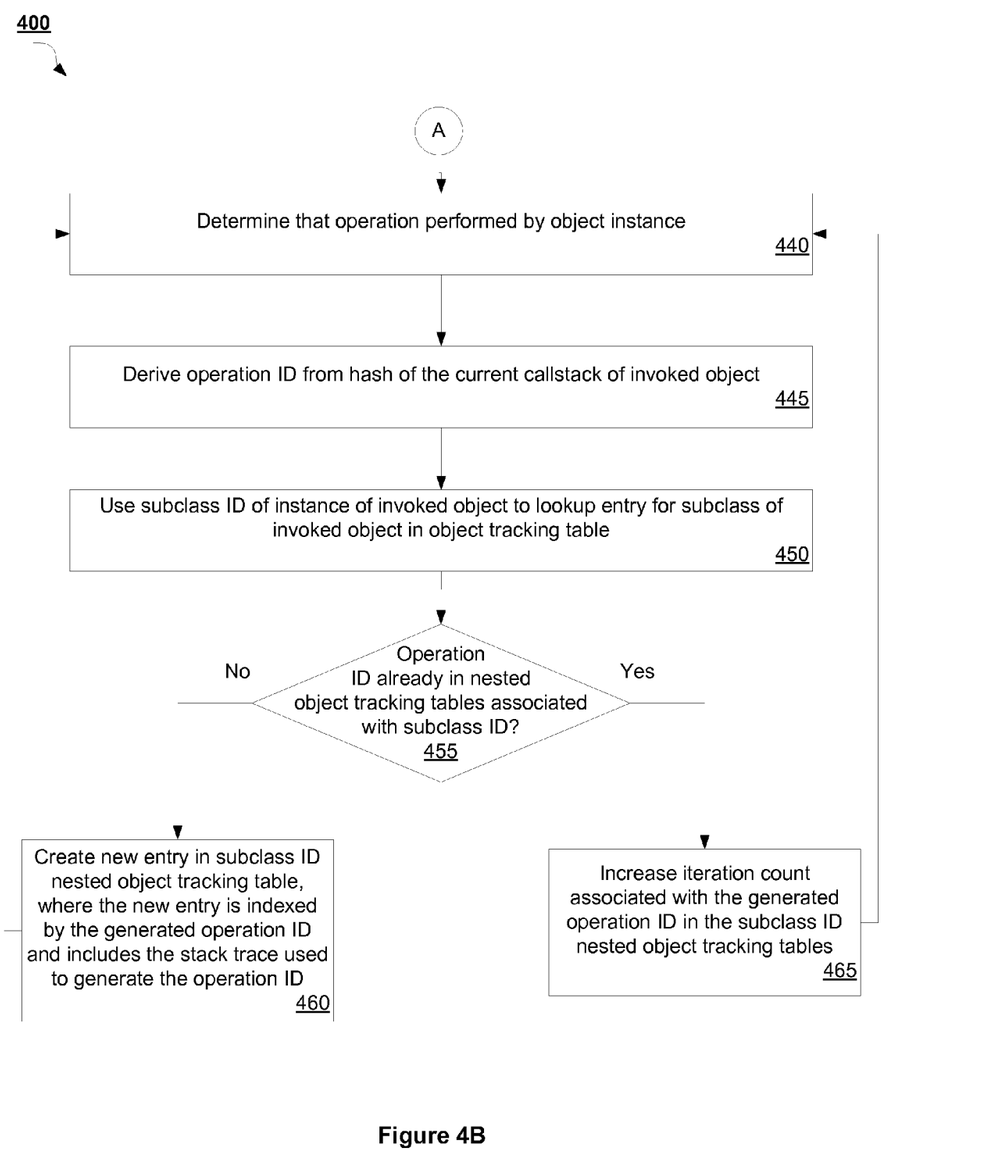

FIGS. 4A and 4B are flow diagrams illustrating a method 400 for tracking subclasses of and operations performed by generic objects in a computer system according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by object subclass tracking module 210, and more specifically object ID generator 214 and logging module 216, of FIG. 2.

Referring to FIG. 4A, method 400 begins at block 405 where an invocation is received from a code annotation in a function executed by a computer program. In one embodiment, the code annotation is placed in the function by the object subclass tracking module as a trigger for the object subclass tracking module to begin tracking operations associated with an object of the function. At block 410, a stack trace is requested from a stack trace generator of a debugging tool that includes the object subclass tracking module. In one embodiment, the stack trace is a report on the active stack frames of a call stack of the function invoking the object subclass tracking module.

Then, at block 415, a subclass ID of the specific instance of the invoked object is generated based on the requested stack trace. In one embodiment, the subclass ID is a hash value resulting from applying a hash function on the entire requested stack trace. For example, the hash function may use addresses of each function in the stack trace as inputs to produce the hash value to use as the subclass ID.

Subsequently, at decision block 420, it is determined whether the subclass ID is already stored in object tracking tables of the debugging tool. In one embodiment, the object tracking tables include multiple nested hash tables, where the top level hash table is indexed by subclass IDs. Each entry in the top-level table may include a description of the callstack for later reporting purposes, as well as a nested table of operations associated with the particular subclass.

If a match is not found at decision block 420, then method 400 proceeds to block 425 where a new entry is created in the object tracking table. If the generated ID is bundled with a subclass ID, then the new entry is created in a nested table accessed from the entry of the subclass ID on the top level table. If there a subclass ID is not bundled with the generated ID, then a new subclass ID is created in the top level table of the object tracking tables. In addition, the new entry should include the stack trace that was used to generate the ID. Then, at block 430, the generated subclass ID is stored in the invoked object instance.

On the other hand, if a matching ID is found in the object tracking tables at decision block 420, then method 400 proceeds to block 435. At block 435, an iteration count associated with the generated ID is increased. In one embodiment, the iteration count is kept as data in the entry and is tracked using a counter mechanism.

Continuing to FIG. 4B, at block 440 it is determined that an operation is performed by the object instance. Then, at block 445, an operation ID is derived from a current callstack of the invoked object. In one embodiment, a hash of the callstack is used to generate the operation ID. At block 450, a subclass ID stored with the object is used to lookup an entry for the subclass of the invoked object in the object tracking table. An entry for the subclass ID should exist, as it was created and inserted into the object tracking table upon initialization of the object (see blocks 425 and 430).

At decision block 455, it is determined whether an entry for the operation ID exists in nested hash tables associated with the subclass ID entry. If not, then method 400 proceeds to block 460 where a new entry in the nested object tracking table for the subclass ID is created for the operation ID. In one embodiment, this new entry is indexed by the generated operation ID and include the stack trace used to generate the operation ID. On the other hand, if the operation ID is found in the nested object tracking tables associated with the subclass ID at decision block 455, then method 400 proceeds to block 465 where an iteration count associated with the located operation ID entry is increased. From both of blocks 460 and 465, method 400 returns to block 440 to continue monitoring and tracking additional operations performed by the invoked object instance.

Figure 5:
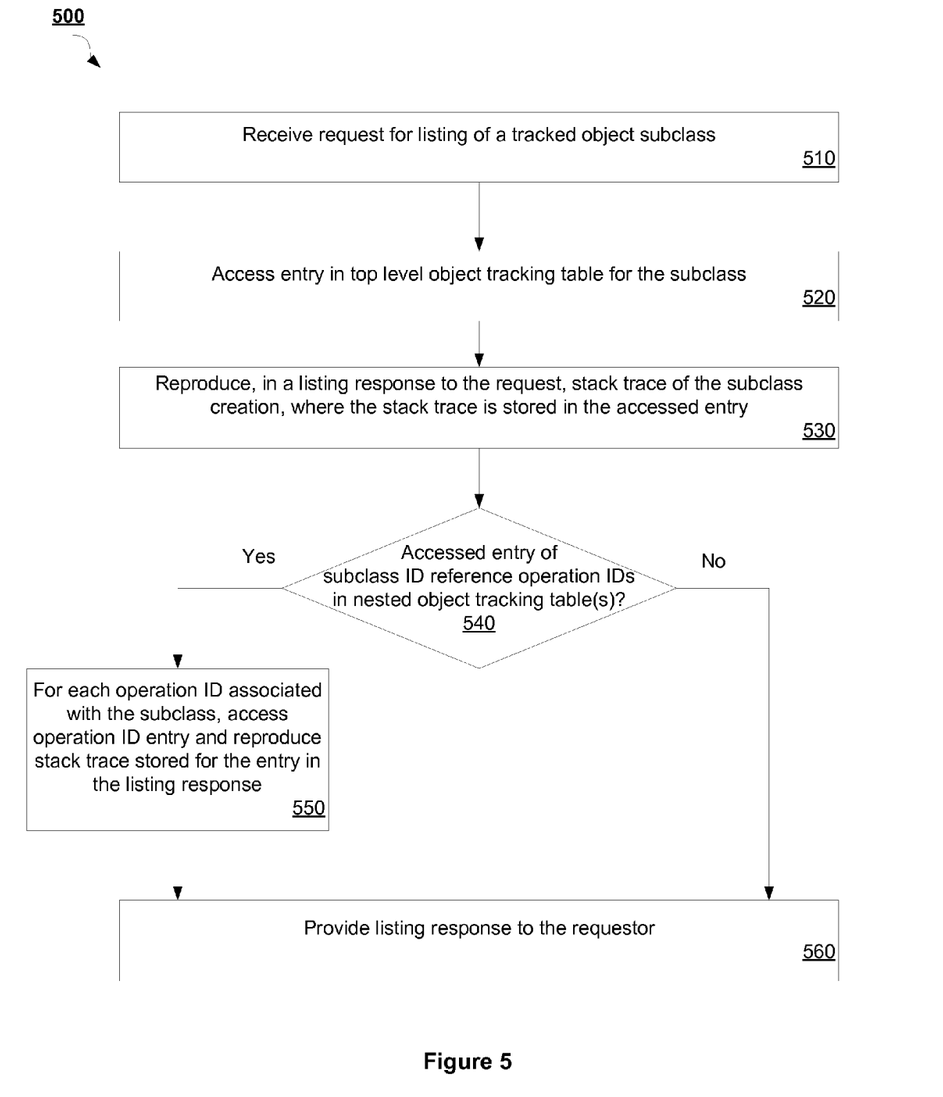
FIG. 5 is a flow diagram illustrating a method for generating a report on results of tracking subclasses of and operations performed by generic objects in a computer system according to an embodiment of the disclosure.

FIG. 5 is a flow diagram illustrating a method 500 for generating a report on results of tracking subclasses of and operations performed by generic objects in a computer system according to an embodiment of the disclosure. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by object subclass tracking module 210, and more specifically reporting module 218, of FIG. 2.

Method 500 begins at block 510 where a request for a listing of a tracked object subclass is received. In one embodiment, an administrator, such as a software programmer or developer, sends the request for the listing. The administrator may use a debugging tool interface to submit the request to the object subclass tracking module. Then, at block 520, an entry for the identified object subclass is accessed in an object tracking table of the debugging tool. In one embodiment, the entry is stored in a top level object tracking table of multiple nested object tracking tables maintained by the debugging tool.

At block 530, a stack trace is reproduced from the accessed entry in a listing response. The stack trace depicts the steps and functions used in the creation of the subclass when a computer program was executing the function. Subsequently, at decision block 540, it is determined whether the accessed subclass ID entry references any operation IDs in nested object tracking tables associated with an entry for the subclass. If so, then method 500 continues to block 550 where, for each operation ID that is referenced, an associated entry for the operation ID is accessed and a corresponding stack trace stored in the entry is reproduced in the listing response. The method then proceeds to block 560, which is discussed in further detail below.

If, at decision block 540, the accessed subclass ID entry does not reference any operation IDs in nested object tracking tables associated with the subclass, then method 500 proceeds to block 560. At block 560, the generated listing response is provided to the requestor of the listing.

Figure 6:
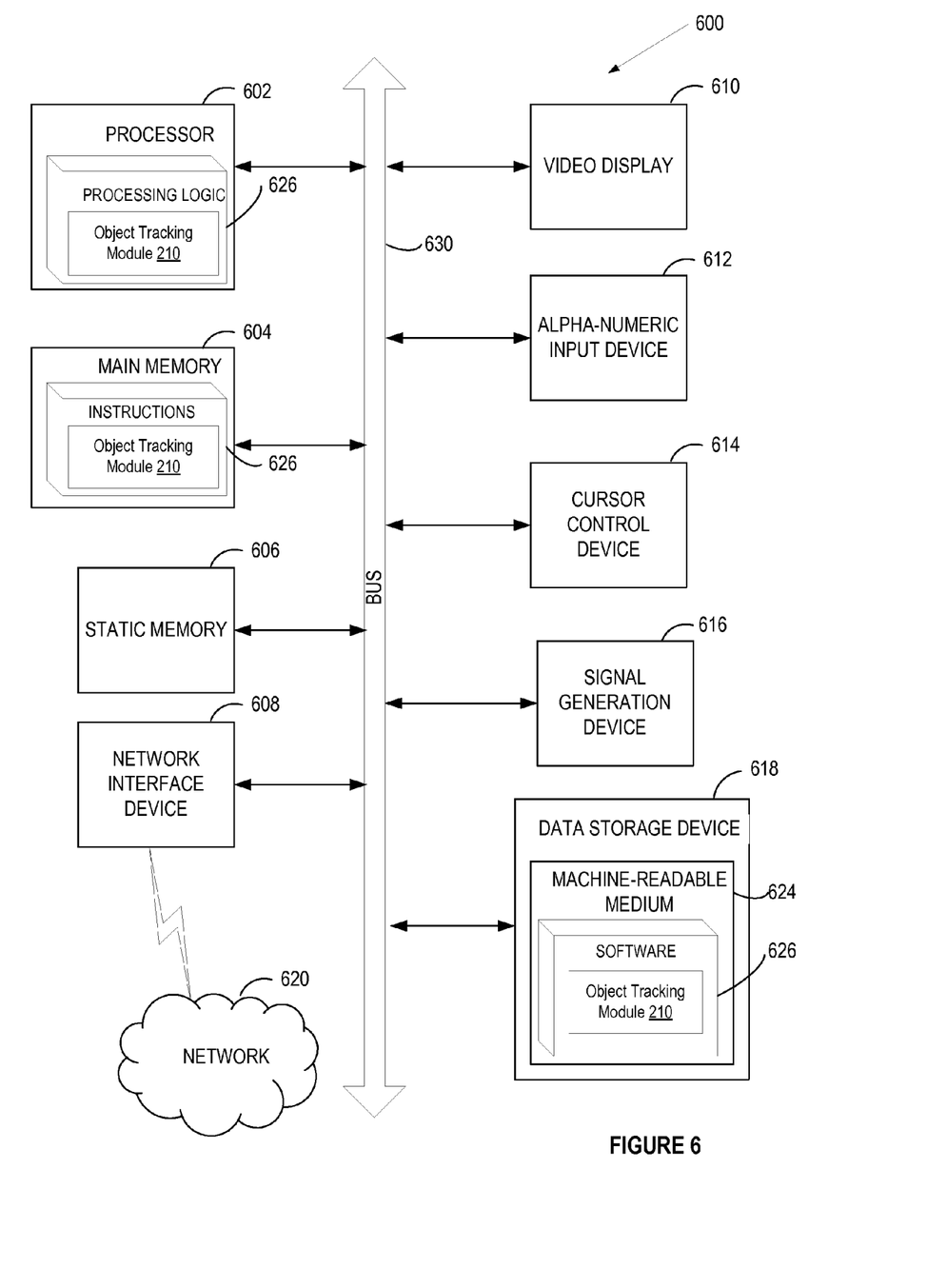
FIG. 6 illustrates a block diagram of one embodiment of a computer system.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608 communicably coupled to a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to implement an object subclass tracking module 210 to perform tracking of subclasses of and operations performed by generic objects in a computer system, such as the computer system described with respect to FIG. 1, and/or a software library containing methods that call the above applications. While the machine-accessible storage medium 628 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "requesting", "generating", "storing", "reproducing", "inserting", "identifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
   identifying a call to a generic initializer function to set a default value for an attribute not specific to a subclass of an object;
   identifying, by a processing device executing a debugging tool, an annotation that is inserted into code of the generic initializer function, wherein the annotation in the code of the generic initializer function invokes identification of the subclass of the object;

requesting, by the processing device, a stack trace of a call stack of the generic initializer function responsive to identifying the annotation in the code of the generic initializer function, wherein the stack trace comprises a function that is specific to the subclass of the object;

generating, by the processing device, a subclass identification (ID) for the subclass of the object using the function in the stack trace; and storing, by the processing device, the subclass ID and the stack trace in a new entry in an object tracking table.

2. The method of claim 1, wherein generating the subclass ID comprises:

inputting data of the stack trace as input to a hash generator to generate the subclass ID.

3. The method of claim 2, wherein the data comprises an address of the function in the stack trace.

4. The method of claim 1, wherein the object is associated with a plurality of subclasses, and the object tracking table comprises one entry per subclass of the object.

5. The method of claim 1, wherein the new entry comprises a nested table indexed by operations of the subclass.

6. The method of claim 1, wherein when the subclass ID is already stored in the object tracking table, and the method further comprises:

increasing an iteration count value in the entry of the subclass ID in the object tracking table.

7. The method of claim 1, wherein the stack trace is used to identify an operation of the subclass of the object, and wherein an operation ID is generated from the stack trace to identify the operation.

8. The method of claim 7, wherein the storing further comprises:

accessing an entry associated with the subclass ID in the object tracking table; and adding a new entry to a nested table accessed from the entry associated with the subclass ID, wherein the new entry comprises the operation ID and the stack trace.

9. A system, comprising:

a memory; and a processing device, operatively coupled to the memory, to:

identify a call to a generic initializer function to set a default value for an attribute not specific to a subclass of an object;

request, upon invocation from an annotation that is inserted into code of the generic initializer function executed by the processing device, a stack trace of a call stack of the generic initializer function;

generate an identification (ID) by using data of the stack trace as input to a hash generator that generates the ID, the ID corresponding to the subclass of an object that is initialized by the generic initializer function;

store the ID and the stack trace in a new entry in an object tracking table; and reproduce the stack trace in a report requested by a user of a debugging tool, the request specifying a subclass of an object that calls the generic initializer function.

10. The system of claim 9, wherein to generate the ID, the processing device is to:

input data of the stack trace as input to a hash generator to generate the subclass ID.

11. The system of claim 10, wherein the object is associated with a plurality of subclasses, and the object tracking table comprises one entry per subclass of the object.

12. The system of claim 9, wherein the new entry comprises a nested table indexed by operations of the subclass.

13. The system of claim 9, wherein when the ID is already stored in the object tracking table, the processing device is further to:

increase an iteration count value in the entry of the ID in the object tracking table.

14. The system of claim 9, wherein the stack trace is used to identify an operation of the subclass of the object, and wherein the processing device is to:

generate an operation ID from the stack trace to identify the operation.

15. The system of claim 14, wherein to store the ID corresponding to the subclass and the stack trace, the processing device is to:

access an entry associated with the ID in the object tracking table; and add a new entry to a nested table accessed from the entry associated with the ID, wherein the new entry comprises the operation ID and the stack trace.

16. A non-transitory machine-readable storage medium including instructions that, when accessed by a processing device, cause the processing device to:

identify, by the processing device, a call to a generic initializer function to set a default value for an attribute not specific to a subclass of an object of a computer program executed by the processing device;

insert, by the processing device, an annotation into code of the generic initializer function, wherein the annotation invokes the processing device to identify and track the subclass of the object;

request, upon invocation from the annotation in the code of the generic initializer function, a stack trace of a call stack of the generic initializer function;

generate, by the processing device, an identification (ID) for the subclass of the object using the function in the stack trace; and store, by the processing device, the ID and the stack trace in a new entry in an object tracking table.

17. The non-transitory machine-readable storage medium of claim 16, wherein to generate the ID, the processing device is to:

input data of the stack trace as input to a hash generator to generate the subclass ID.

18. The non-transitory machine-readable storage medium of claim 17, wherein the object is associated with a plurality of subclasses, and the object tracking table comprises one entry per subclass of the object.

19. The non-transitory machine-readable storage medium of claim 16, wherein the ID is already stored in the object tracking table, and the processing device is to: increase an iteration count value in the entry of the ID in the object tracking table.

20. The non-transitory machine-readable storage medium of claim 19, wherein the processing device is further to:

access an entry associated with the ID in the object tracking table; and add a new entry to a nested table accessed from the entry associated with the subclass ID, wherein the new entry comprises the operation ID and the stack trace.

* * * * *